UNITED STATES PATENT OFFICE.

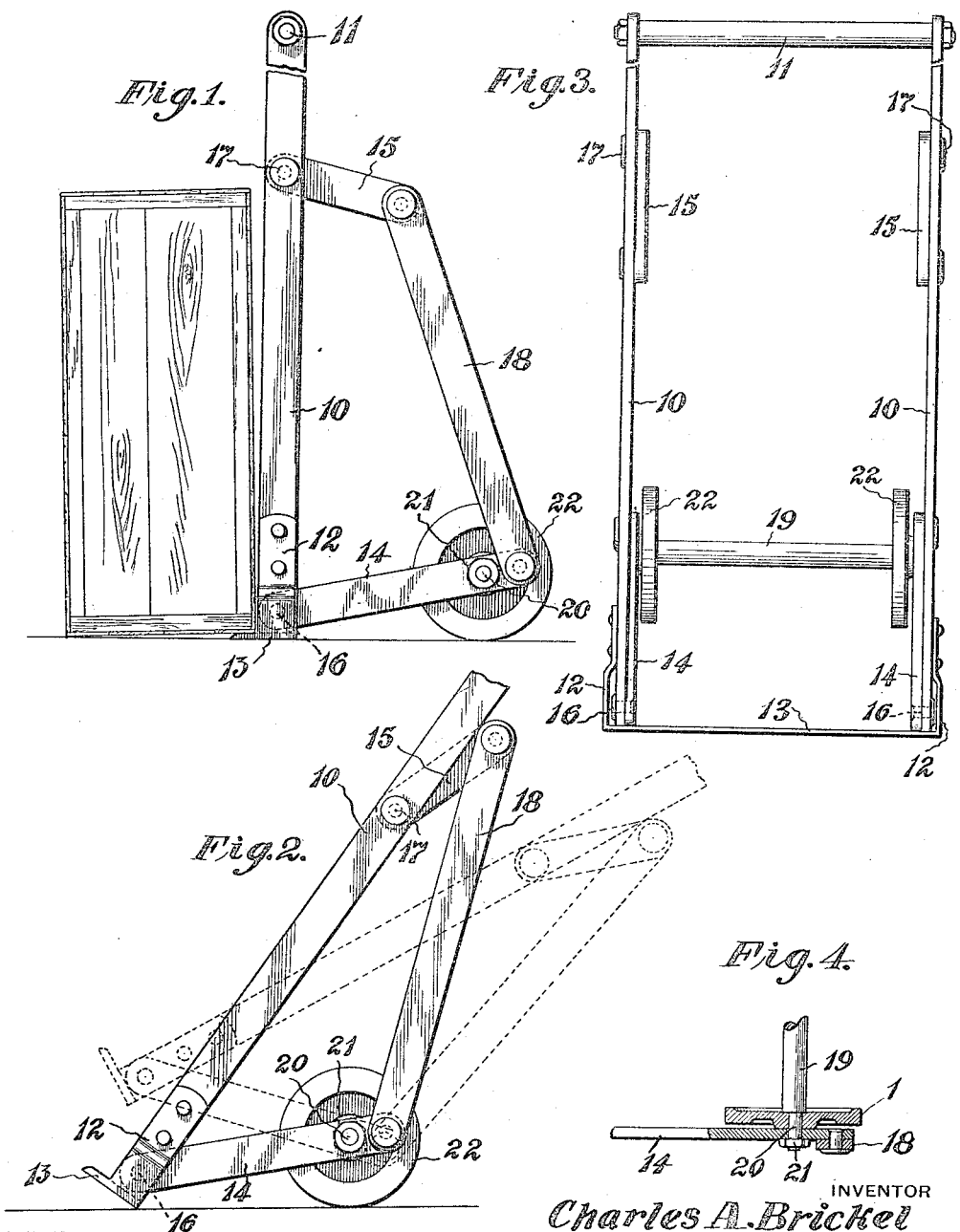

CHARLES A. BRICKEL, OF ILION, NEW YORK.

TRUCK.

1,227,875.

Specification of Letters Patent. Patented May 29, 1917.

Application filed July 10, 1916. Serial No. 108,456.

*To all whom it may concern:*

Be it known that I, CHARLES A. BRICKEL, a citizen of the United States, residing at Ilion, in the county of Herkimer and State of New York, have invented certain new and useful Improvements in Trucks, of which the following is a specification.

This invention relates to an improved truck and the principal object of the invention is to provide a truck having an improved frame construction so that the engaging lip may be inserted beneath a box or other heavy article and the handle portion of the truck then tilted rearwardly with the engaging lip as a fulcrum and after the truck has been tilted rearwardly to support the box in a reclining position, the entire frame may be tilted backwardly upon the axle and supported by the wheels and thus permitted to be easily moved from one place to another.

Another object of the invention is to so construct this truck that the bars and links forming the frame thereof may be pivotally connected and limited in their swinging movement.

Another object of the invention is to so construct this truck that the frame thereof may be formed principally of solid bars thus providing strength and durability and at the same time providing a comparatively light structure which will be easy to operate.

This invention is illustrated in the accompanying drawings wherein:—

Figure 1 is a view in side elevation showing the truck in its initial position,

Fig. 2 is a side elevation showing the truck tilted to its second position, the third position being indicated by dotted lines, Fig. 3 is a top plan view of the truck when in use as shown in the dotted line portion of Fig. 2.

Fig. 4 is a fragmentary sectional view showing the mounting of one of the wheels.

The side bars or handles 10 have their outer end portions connected by the cross bar 11 and have their forward end portions connected with the side arms 12 of the engaging lip 13 which extends outwardly beyond the side arms so that it may obtain a good grip upon a box which is to be conveyed from one place to another. Links or standards 14 and 15 are pivotally connected with the side bars 10 by means of the pivot pins 16 and 17, the end portions of these standards being pivotally connected with the longitudinally extending bars 18. It will thus be noted that a frame has been provided in which the bars forming the same are pivotally connected so that the frame may assume either the position shown in Fig. 1 or the position shown in Fig. 2. It should be further noted that the side arms 12 are bent adjacent the engaging lip 13 so that these side arms will not bind against the heads of the pins 16 and prevent easy turning of the pins. The axle 19 extends between the standards 14 and is provided with reduced ends 20 which extend through openings formed in the standards 14 and are threaded so that the axle may be held in place by the securing nuts 21. The wheels 22 are mounted upon the reduced ends of the axle and from an inspection of Fig. 4 it will be readily seen that while the wheels may rotate freely, they cannot have longitudinal movement upon the axle.

When in use the truck is rolled across to the box or other heavy article which is to be moved and then is positioned in an upright position with the lip 13 extending beneath the box. The cross bar 11 can then be grasped with one hand and the box engaged by a hook with the second hand. By tilting the frame rearwardly, it will be moved to the position shown in full lines in Fig. 2 and the box will be supported upon the truck. The truck can then be moved to the position indicated by dotted lines in Fig. 2 and the truck then rolled across the floor to the point where it is desired to deposit the box. The truck will then be returned to the original position by first moving it to the position shown in full lines in Fig. 2 and then swinging it up to the vertical position. It should be noted that when the truck is swung to the position indicated by dotted lines in Fig. 2 the side bars 10 will engage the ends of the side bars 18 and thus the pivotal movement will be limited in this direction and it should be further noted that when the frame is tilted forwardly, the swinging movement of the bars 18 will be limited by engagement with the securing nut 21 for the axle. I have thus provided a truck that will be very convenient for use and which will be strong and durable and not liable to easily break or get out of order.

What is claimed is:—

1. A truck comprising a frame including side bars, a cross bar connecting said side bars, an engaging lip extending between said side bars, and having side arms connected with the forward end portions of said side bars, forward and rear standards pivotally connected with said side bars, an axle rotatably carried by the forward standards, supporting wheels rotatably mounted upon said axle, and bars pivotally connected with the end portions of said standards.

2. A truck comprising a frame including side bars, an engaging lip extending between said side bars and extending beyond the same, side arms extending from said engaging lip and connected with the forward end portions of said side bars, forward standards having pins pivotally connecting the same with the forward end portions of said side bars, the side arms being bent to extend in spaced relation to the securing pins for said standards, rear standards pivotally connected with said side bars, an axle carried by said forward standards, supporting wheels mounted upon said axle, and bars pivotally connected with the end portions of the forward and rear standards.

3. A truck comprising a frame including side bars, an engaging lip connected with the forward end portions of said side bars, forward and rear standards pivotally connected with said side bars, an axle having reduced end portions extending through openings formed in the forward standards, supporting wheels rotatably mounted upon the reduced end portions of said axle, and connecting bars pivotally connected with the forward and rear standards.

4. A truck comprising a frame including side bars, an engaging element carried by said side bars, forward and rear standards pivotally connected with said side bars, an axle carried by said forward standards and having its end portions extending through the same, securing means mounted upon the end portions of said axle, and connecting bars pivotally connected with said standards and engaging said securing means when moved in one direction to limit the forward pivotal movement of said connecting bars, said side bars engaging said connecting bars when swung rearwardly to limit the rearward pivotal movement of the side bars.

In testimony whereof I affix my signature in presence of two witnesses.

CHARLES A. BRICKEL.

Witnesses:
Ross J. Woodward,
M. E. Jones.

Copies of this patent may be obtained for five cents each, by addressing the "Commissioner of Patents, Washington, D. C."